US012810658B2

(12) United States Patent
Nagatani

(10) Patent No.: US 12,810,658 B2
(45) Date of Patent: Nov. 24, 2026

(54) INFORMATION PROCESSING APPARATUS FOR VEHICLE ASSESSMENT

(71) Applicant: TOYOTA JIDOSHA KABUSHIKI KAISHA, Toyota (JP)

(72) Inventor: Takaaki Nagatani, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 20 days.

(21) Appl. No.: 18/941,481

(22) Filed: Nov. 8, 2024

(65) Prior Publication Data

US 2025/0209865 A1 Jun. 26, 2025

(30) Foreign Application Priority Data

Dec. 21, 2023 (JP) ................................. 2023-215895

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01); *G07C 5/0825* (2013.01); *G07C 5/085* (2013.01)

(58) Field of Classification Search
CPC .... G07C 5/008; G07C 5/0808; G07C 5/0825; G07C 5/085; G07C 5/0841; G06N 3/02; G06N 20/00; G05B 23/0262; G05B 2219/24065
See application file for complete search history.

(56) References Cited

U.S. PATENT DOCUMENTS

2018/0350167 A1* 12/2018 Ekkizogloy ......... B60R 11/0247
2021/0272394 A1* 9/2021 Cella ...................... G06Q 40/08
2022/0126864 A1* 4/2022 Moustafa .......... B60W 60/0013
2023/0055945 A1 2/2023 Nakashima et al.
2024/0034362 A1* 2/2024 Oba .................. B60W 60/0051
2024/0290144 A1* 8/2024 Lee ..................... B60W 50/045

FOREIGN PATENT DOCUMENTS

JP 2023-28141 3/2023
JP 2023-74377 A 5/2023

* cited by examiner

*Primary Examiner* — Stephanie T Su

(74) *Attorney, Agent, or Firm* — Oblon, McClelland, Maier & Neustadt, L.L.P.

(57) ABSTRACT

A controller is provided which is configured to perform: acquiring and accumulating a plurality of types of data collected in a vehicle, the plurality of types of data correlated with deterioration of the vehicle; generating a relationship between an accumulated plurality of types of data and a result of an actual assessment of the vehicle corresponding to the plurality of types of data; outputting information on an assessment of a first vehicle according to the plurality of types of data accumulated for the first vehicle and the relationship.

4 Claims, 5 Drawing Sheets

VEHICLE INFORMATION DB 231

| VEHICLE ID | USER ID | STEERING WHEEL | ACCELERATOR | BRAKE | ENGINE |
|---|---|---|---|---|---|
| V001 | xxx | xxx | xxx | xxx | xxx |
| ... | ... | ... | ... | ... | ... |

FIG. 2

INFORMATION PROCESSING APPARATUS FOR VEHICLE ASSESSMENT

CROSS REFERENCE TO THE RELATED APPLICATION

This application claims the benefit of Japanese Patent Application No. 2023-215895, filed on Dec. 21, 2023, which is hereby incorporated by reference herein in its entirety.

BACKGROUND

Technical Field

The present disclosure relates to an information processing apparatus.

Description of the Related Art

Techniques are known to read and analyze the fault code recorded in the in-vehicle fault diagnosis device of the vehicle to be assessed, and to reflect the expected repair cost in the purchase price (see, for example, Patent Literature 1).

CITATION LIST

Patent Literature

Patent Literature 1: JP 2023-074377A

SUMMARY

The purpose of the present disclosure is to perform a vehicle assessment remotely and more accurately.

One aspect of the present disclosure is directed to an information processing apparatus including a controller configured to perform:

- acquiring and accumulating a plurality of types of data collected in a vehicle, the plurality of types of data correlated with deterioration of the vehicle;
- generating a relationship between an accumulated plurality of types of data and a result of an actual assessment of the vehicle corresponding to the plurality of types of data;
- outputting information on an assessment of a first vehicle according to the plurality of types of data accumulated for the first vehicle and the relationship.

The present disclosure can also be viewed as an information processing method in which a computer executes processing of the information processing apparatus, as described above. In addition, the present disclosure can be viewed as an information processing program for causing the computer to execute the information processing method, or as a non-transitory storage medium storing the information processing program.

According to the present disclosure, an assessment of the vehicle can be performed remotely and more accurately.

BRIEF DESCRIPTION OF THE DRAWINGS

FIG. 2 is a diagram illustrating a table configuration of the vehicle information DB according to an embodiment.

DESCRIPTION OF THE EMBODIMENTS

Figure 1:
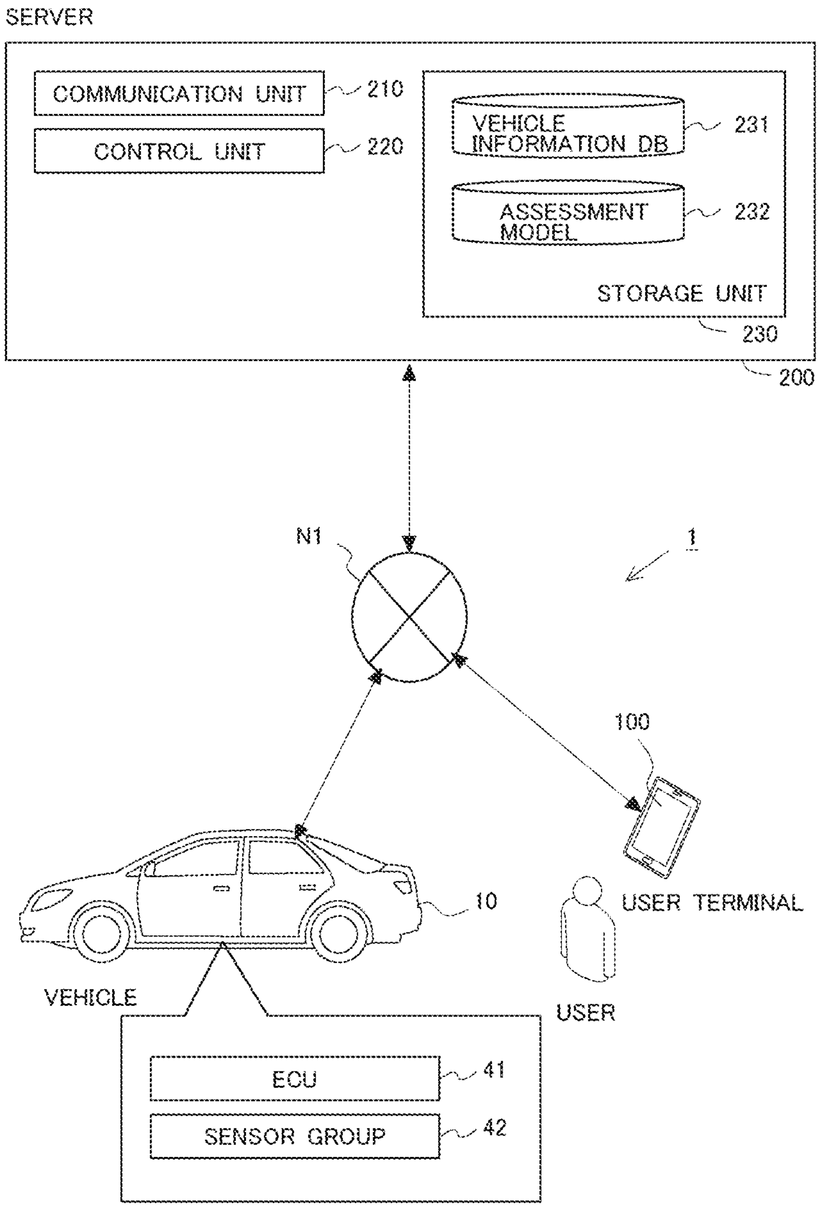
FIG. 1 is a block diagram schematically illustrating an example configuration of a system in an embodiment.

When the user of the vehicle wishes to assess the vehicle, it is conceivable to perform the assessment remotely. For example, it is envisioned that the assessment will be based on images taken of the vehicle and information obtained by fault diagnosis. However, in some cases, the information obtained by imaging and fault diagnosis does not sufficiently represent the condition of the vehicle. For example, deterioration in areas that are difficult for the user to photograph, or deterioration in areas that cannot be diagnosed by fault diagnosis, it was necessary for the assessor to actually see and judge the vehicle. It is also possible to obtain GPS information from the vehicle and make an assessment based on the location where the vehicle was driven. However, information on places visited by users may contain personal information, but it may be difficult to use. In addition, it is conceivable to estimate the usage of the vehicle by acquiring the age of the driver of the vehicle, however, the age of the driver may be difficult to use because it includes personal information.

On the other hand, the information processing apparatus according to the present disclosure uses information that does not contain personal information to remotely assess the vehicle. Therefore, the controller acquires and accumulates a plurality of types of data that are collected in the vehicle and are correlated with deterioration of the vehicle. The plurality of types of data are stored, for example, in a memory of the information processing apparatus. The plurality of types of data is data that correlates with deterioration of the vehicle, and does not include information that identifies the user, information that depends on the user, or information that identifies the user's location. For example, it may include at least 2 of data on the operating angle of the steering wheel, data on the travel distance of the accelerator pedal, data on the travel distance of the brake pedal, and data on the operating time of the engine. These data may be detected, for example, by sensors installed in the vehicle. By using at least two pieces of data, it is possible to reduce the impact of disturbances, etc.

The operating angle of the steering wheel may be an operating amount of the steering wheel. If the steering wheel is turned while the vehicle is running, the vehicle will deteriorate due to the force exerted on the parts of the vehicle. Therefore, the operating angle of the steering wheel is correlated with the deterioration of the vehicle. In addition, the travel distance of the accelerator pedal may be an amount in which the accelerator pedal is stepped on, or an amount of travel of the accelerator pedal. Depressing the accelerator pedal causes the vehicle to accelerate, causing force to be applied to the vehicle's components and a load to be applied to the engine, leading to deterioration of the vehicle. Therefore, the travel distance of the accelerator pedal is correlated with the deterioration of the vehicle. In addition, the travel distance of the brake pedal may be an amount in which the brake pedal is stepped on, or an amount of travel of the brake pedal. Depressing the brake pedal exerts force on the parts of the vehicle, leading to deterioration of the vehicle. Therefore, the travel distance of the brake pedal is correlated with the deterioration of the vehicle. In addition, the operating time of the engine may be the time from IG-ON to IG-OFF. It is believed that the vehicle's driving distance will increase depending on the operating time of the engine, and deterioration of the vehicle will progress. In addition, depending on the operating time of the engine, the deterioration of the engine also progresses. Therefore, the operating time of the engine is correlated with the deterioration of the vehicle. By acquiring and accumulating such a plurality of types of data, it is possible to accumulate data that is correlated with deterioration of the vehicle.

Further, the controller generates a relationship between the accumulated plurality of types of data and the result of actual assessment of the vehicle corresponding to the plurality of types of data. For example, when an assessor actually makes an assessment of a vehicle, a correlation can be obtained with a plurality of types of data accumulated for the vehicle. For example, the controller may generate a model in which the accumulated plurality of types of data are used as input data, and information on the assessment of the vehicle is used as output data, and a model in which the accumulated plurality of types of data and data on the result of the actual assessment of the vehicle corresponding to the plurality of types of data are used as teacher data. By generating this model by the controller, the controller can acquire a plurality of types of data and a relationship with the actual result of the assessment. As another example, statistical methods can be used to generate a relationship between a plurality of types of data and the results of the actual assessment.

Then, the controller outputs information on the assessment of the first vehicle according to the plurality of types of data accumulated for the first vehicle and the relationship. For example, by inputting a plurality of types of data accumulated for the first vehicle to the model, information on the assessment of the first vehicle is output. The information on the assessment of the first vehicle is information representing the value of the first vehicle. The information on the assessment of the first vehicle may be, for example, information on the number of points or rank when the value of the first vehicle is indicated by the number of points or rank.

In this way, the controller outputs information on the assessment of the first vehicle, so that the assessment of the vehicle can be performed remotely even if the assessor does not actually assess the vehicle. In addition, assessments can be made based on data that is not linked to personal information.

Hereinafter, a specific embodiment of the present disclosure will be described based on the accompanying drawings. The hardware configuration, module configuration, function configuration, etc. described in the following embodiments are not intended to limit the technical scope of the disclosure to only those unless otherwise stated.

EMBODIMENT

Embodiments of the present disclosure will be described using the accompanying drawings. The present embodiment describes an example of applying the information processing apparatus according to the present disclosure to a system that provides a vehicle service.

(System Structure)

FIG. 1 is a block diagram schematically illustrating an example configuration of a system 1 in the present embodiment. The system 1 in the present embodiment is a system that provides a service for an assessment of the vehicle 10 to a user, and is configured to include the vehicle 10, the user terminal 100, and the server 200. In the example shown in FIG. 1, only one vehicle 10 and user terminal 100 are illustrated, but a plurality of vehicles 10 and user terminals 100 may be included in the system 1.

The user terminal 100 is a terminal used by the user of the vehicle 10, for example, a smartphone, a tablet terminal, a wearable terminal, or a personal computer (PC). An application program of a browser is installed in the user terminal 100 in the present embodiment. The user terminal 100 includes a processor such as a CPU or GPU, a storage device such as a RAM and a ROM, an input unit that receives user input operations, and a display that presents information to the user. The input unit and the display may be configured as one touch panel display.

The user terminal 100 requests the server 200 to assess the vehicle 10 according to the user's input operation. At this time, the vehicle ID, which is the identification information of the vehicle 10, and the user ID, which is the identification information of the user, are transmitted to the server 200. Then, when the user terminal 100 receives information on the assessment from the server 200, the user terminal 100 causes the display to display the information as a result of the assessment.

The vehicle 10 includes an ECU 41 which are electronic control units and a sensor group 42. These components are connected to each other by the CAN bus, the bus of the in-vehicle network.

The ECU 41 may be configured as a computer having a processor such as a CPU or GPU, a main storage device such as RAM and ROM, an auxiliary storage device such as an EPROM, a hard disk drive, or a removable medium, and a communication device that is a wireless communication circuit that communicates with the server 200 via a network N1. The ECU 41 may be a component such as a Data Communication Module (DCM), a head unit, or a car navigation system.

The sensor group 42 includes, for example, a-sensor that detects a state of the vehicle 10 and a-sensor that detects an operation of the driver. The sensor group 42 includes, for example, a speed-sensor, an acceleration sensor, an accelerator opening-degree-sensor that detects the position of the accelerator pedal, a brake-sensor that detects the position of the brake pedal, a steering wheel angle-sensor that detects the angle of the steering wheel, an engine rotation speed sensor that detects the rotation speed of the engine, a yaw-rate sensor, a turn signal switch sensor (a-sensor that detects the state of the turn signal switch), a shift position-sensor, and a position information sensor (GPS sensor). In addition, the sensor group 42 may include a-sensor that detects that a system such as pre-crash safety has been activated.

The ECU 41 transmits the detection value of the sensor group 42 to the server 200 via the communication device. Note that the detection values of the sensor group 42 may be transmitted sequentially to the server 200 when the vehicle 10 is in the activated state, and may be transmitted collectively to the server 200 every trip. The ECU 41 associates the detection value of the sensor group 42 with the vehicle ID and the user ID and transmits it to the server 200.

The server 200 is a computer operated by a service provider that assesses the vehicle 10. As an example, the service provider may be a business operator who has sold or leased the vehicle 10 to the user, or may be a business operator who purchases or sells the used car. The server 200 may be configured as a computer having a processor such as a CPU or GPU, a main storage device such as RAM and ROM, and an auxiliary storage device such as an EPROM, a hard disk drive, or a removable medium. An operating system (OS), various programs, and various tables are stored in the auxiliary storage device of the server 200. The processor of the server 200 loads and executes the program stored in the auxiliary storage device to the bodywork area of the main storage device, thereby realizing each function that conforms to a predetermined purpose, as described later. However, some or all of the functions of the server 200 may be realized by a hardware circuit such as an ASIC (Application Specific Integrated Circuit) or an FPGA (Field Programmable Gate Array).

The server 200 in the present embodiment is configured to realize a web server for performing interaction with the user terminal 100. By performing interaction with the user terminal 100 through execution of the web server, the server 200 receives a request for an assessment of the vehicle 10 from the user of the vehicle 10 and provides the result of the assessment to the user. Note that the server 200 may provide the above-described services by means other than the web server. For example, a service that interacts with the dedicated application software installed in the user terminal 100 by a predetermined protocol may be performed at the server 200.

The server 200 that realizes the above-described functions includes a communication unit 210, a control unit 220, and a storage unit 230, as shown in FIG. 1. The storage unit 230 includes a main storage device and an auxiliary storage device. The storage unit 230 stores the vehicle information DB 231 and the assessment model 232. The vehicle information DB 231 is a database in which data acquired from the vehicle 10 is stored. The assessment model 232 is a model that outputs data on the assessment of the vehicle 10.

The communication unit 210 is a communication interface for connecting the server 200 to a network N1. The communication unit 210 connects to a network N1 via, for example, a LAN or Wi-Fi (registered trademark), and communicates with the vehicle 10 and the user terminal 100 via the network N1. The network N1 is, for example, a WAN, which is a worldwide public communication network such as the Internet, or another communication network.

The control unit 220 is a software module realized by executing the program stored in the auxiliary storage device by the processor of the server 200. The control unit 220 executes an interaction with the user terminal 100 through the execution of the web server. In the present embodiment, the control unit 220 causes the web page to be displayed in the browser of the user terminal 100. In one example, the web page includes an input field for the user ID and the vehicle ID.

When the user ID and the vehicle ID are input on the web page, the control unit 220 generates assessment information. The assessment information is information on the assessment of the vehicle 10. In generating such assessment information, the control unit 220 extracts the vehicle information from the vehicle information DB 231 according to the user ID and the vehicle ID input on the web page, and inputs the vehicle information to the assessment model 232. Then, the assessment information is output from the assessment model 232.

Here, when the control unit 220 receives the detection value of the sensor group 42 from the vehicle 10, the control unit 220 generates the vehicle information and stores it in the vehicle information DB 231. The vehicle information is information obtained from the detection value of the sensor group 42 of the vehicle 10 and is information on a physical quantity that correlates with the deterioration of the vehicle 10. FIG. 2 is a diagram illustrating a table configuration of the vehicle information DB 231 according to an embodiment. The vehicle information DB 231 includes a vehicle ID, a user ID, a steering wheel, an accelerator, a brake, and a field of an engine. The record of the vehicle information DB 231 is updated every time the detected value of the sensor group 42 is received from the vehicle 10.

In the vehicle ID field, information (vehicle ID) capable of identifying the vehicle 10 is stored. In the user ID field, information (user ID) that can identify the user associated with the vehicle 10 is stored. The vehicle ID and the user terminal 100 are associated with the user ID.

The steering wheel field is populated with information on the total operating angle of the steering wheel. An aggregate of the operating angles of the steering wheel is a value obtained by integrating an amount of change in the angle of the steering wheel at a predetermined time. The angle of the steering wheel is obtained by the steering wheel angle-sensor. As another example, information on the aggregate of the operation amount of the steering wheel may be input in the steering wheel field. The aggregate of the steering wheel operation amount is the aggregate of the distance traveled by a predetermined point on the steering wheel. The steering wheel operation amount is calculated based on the rotation angle of the steering wheel and the radius of the steering wheel. The control unit 220 calculates the operating angle of the current steering wheel based on the detection value of the steering wheel angle-sensor acquired from the vehicle 10 and adds it to the total operating angle of the steering wheel stored in the steering wheel field of the vehicle information DB 231. The steering wheel field is updated by storing this value in the steering wheel field. In this manner, the control unit 220 causes the vehicle information DB 231 to store a sum total of the operating amount of the steering wheel from the new vehicle state to the current state.

In the accelerator field, information on the total travel distance of the accelerator pedal is input. The aggregate of the travel distance of the accelerator pedal is a value obtained by integrating an amount of change in the position of the accelerator pedal at a predetermined time. The position of the accelerator pedal is obtained by the accelerator opening sensor. The control unit 220 calculates the travel distance of the accelerator pedal this time based on the detection value of the accelerator opening sensor acquired from the vehicle 10 and adds it to the total travel distance of the accelerator pedal stored in the accelerator field of the vehicle information DB 231. The accelerator field is updated by storing this value in the accelerator field. In this manner, the control unit 220 causes the vehicle information DB 231 to store a sum total of the travel distance of the accelerator pedal from the new vehicle state to the present moment.

The brake field is populated with information on the total travel distance of the brake pedal. The sum total of the travel distance of the brake pedal is a value obtained by integrating an amount of change in the position of the brake pedal at a predetermined time. The position of the brake pedal is obtained by the brake-sensor. The control unit 220 calculates the current brake pedal movement distance based on the detection value of the brake sensor, and adds it to the total brake pedal movement distance stored in the brake field of the vehicle information DB 231. The brake field is updated by storing this value in the brake field. In this manner, the control unit 220 causes the vehicle information DB 231 to store a sum total of the travel distance of the brake pedal from the new vehicle state to the present moment.

In the engine field, information on the total operating time of the engine from the time of the new car in the vehicle 10 is input. The total operating time of the engine may be, for example, an accumulated time from IG-ON to IG-OFF, or an accumulated time when the engine rotation speed detected by the engine rotation speed-sensor is higher than 0. In the case of the vehicle 10 driven by the electric motor, information on the total operating time of the electric motor may be input in the engine field. For example, the control unit 220 calculates the operating time of the current engine based on the detection value of the engine rotation speed-sensor acquired from the vehicle 10 and adds it to the sum total of the operating time of the engine stored in the engine field of the vehicle information DB 231. The engine field is updated by storing this value in the engine field. In this manner, the control unit 220 causes the vehicle information DB 231 to store the total operating time of the engine from the new vehicle state to the present time.

Note that in the example shown in FIG. 2, there are each field of steering wheel, accelerator, brake, and engine, but not all of these are essential. At least 2 of the data must be stored. In addition, each field of the steering wheel, accelerator, brake, and engine is an example, and may have a field storing another physical quantity that is correlated with the deterioration of the vehicle 10. For example, the vehicle information DB 231 may further store information on the total mileage of the vehicle 10.

Figure 3:
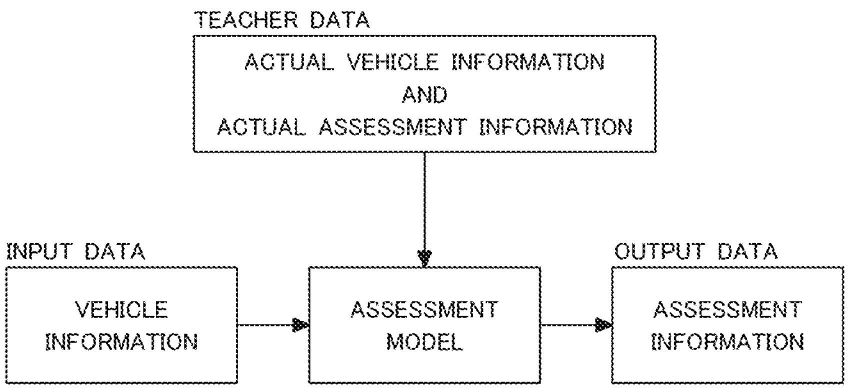
FIG. 3 is a diagram illustrating an overview of the assessment model.

In addition, the control unit 220 generates and stores the assessment model 232 in the storage unit 230. FIG. 3 is a diagram illustrating an overview of the assessment model 232. The assessment model 232 is a machine learning model in which vehicle information is used as input data and assessment information is used as output data. The assessment model 232 is a machine learning model in which actual vehicle information and information obtained by the assessor actually assessing the vehicle 10 (actual assessment information) are constructed as teacher data. The actual vehicle information is information stored in the vehicle information DB 231. The actual assessment information corresponding to the actual vehicle information is obtained, for example, from the assessor's terminal. Note that the actual assessment information corresponds to the data on the actual assessment result of the vehicle corresponding to a plurality of types of data.

The vehicle information and the actual vehicle information input to the assessment model 232 are information corresponding to at least two fields of steering wheel, accelerator, brake, and engine shown in FIG. 2. The assessment information may be, for example, information representing the value of the vehicle 10 in numerical values and ranks. The assessment information may be, for example, information representing the state of the vehicle 10 in four stages, such as excellent, good, acceptable, and not acceptable.

Figure 4:
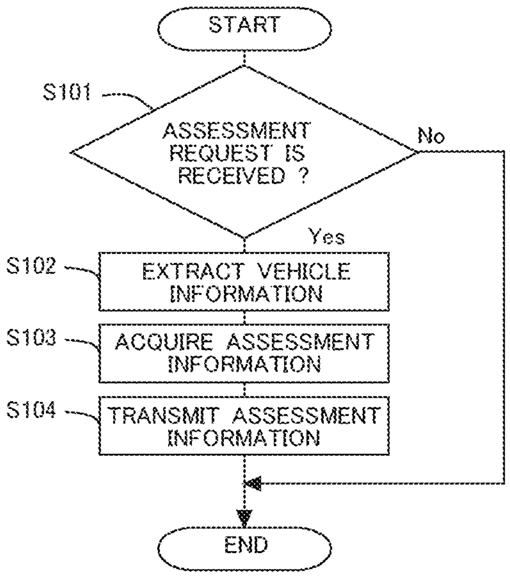
FIG. 4 is a flowchart illustrating processing performed in the server.

FIG. 4 is a flowchart illustrating processing performed in the server 200. The assessment model 232 is described as having been trained.

When the user inputs information for requesting an assessment of the vehicle 10 via a web browser of the user terminal 100, the assessment request is transmitted from the user terminal 100 to the server 200. In step S101, the control unit 220 determines whether or not an assessment request is received from the user terminal 100. When the control unit 220 deems it positive in step S101, the processing proceeds to step S102, and the processing ends when the control unit 220 deems it negative.

In step S102, the control unit 220 extracts the vehicle information. The control unit 220 extracts the vehicle information by extracting records corresponding to the vehicle ID and the user ID included in the assessment request from the vehicle information DB 231. In step S103, the control unit 220 acquires the assessment information. The control unit 220 obtains assessment information as output data by inputting the vehicle information extracted in step S102 to the assessment model 232 as input data. The acquired assessment information is stored in the storage unit 230.

In step S104, the control unit 220 transmits the acquired assessment information to the user terminal 100. At this time, the control unit 220 may generate and transmit a command to cause the user terminal 100 to display the assessment information. In addition, the assessment information may include information on the data used for the assessment. For example, the user may be notified of what kind of data the assessment was based on. This allows the user to know the basis for the assessment.

Actions and Effects of Embodiments

In the above-described embodiment, the evaluation of the vehicle 10 can be performed remotely because the detection value of the sensor group 42 of the vehicle 10 can be used to evaluate the vehicle 10. In addition, an assessment of the vehicle 10 can be performed without the need for assessment by the assessor. In addition, since the information pertaining to the personal information is not used to assess the vehicle 10, the personal information of the user can be protected. In addition, the user can easily obtain the assessment result of the vehicle 10. In addition, the user can know that the assessment will change depending on how the vehicle 10 is operated, and therefore can improve the way the vehicle 10 is operated.

In the present embodiment, the server 200 corresponds to the "information processing apparatus" according to the present disclosure. In addition, the control unit 220 of the server 200 corresponds to the "control unit" according to the present disclosure. Further, the storage unit 230 of the server 200 corresponds to the "storage unit" according to the present disclosure.

Other Embodiment

The above-described embodiment and modification are merely examples, but the present disclosure can be implemented with appropriate modifications without departing from the spirit thereof. For example, the processing performed on the server 200 may be performed on the vehicle 10 or the user terminal 100. In that case, the vehicle 10 or the user terminal 100 corresponds to the "information processing apparatus" according to the present disclosure. In addition, a "controller" according to the present disclosure is achieved by the processor of the vehicle 10 or the user terminal 100 executing a dedicated application program. In addition, the vehicle 10 may have a function of the user terminal 100. For example, an assessment request may be sent from the vehicle 10 to the server 200 by the user performing a predetermined input on the touch panel display provided in the vehicle 10. Further, the information on the assessment of the vehicle 10 may be displayed on the display of the vehicle 10 receiving the information on the assessment from the server 200.

Figure 5:
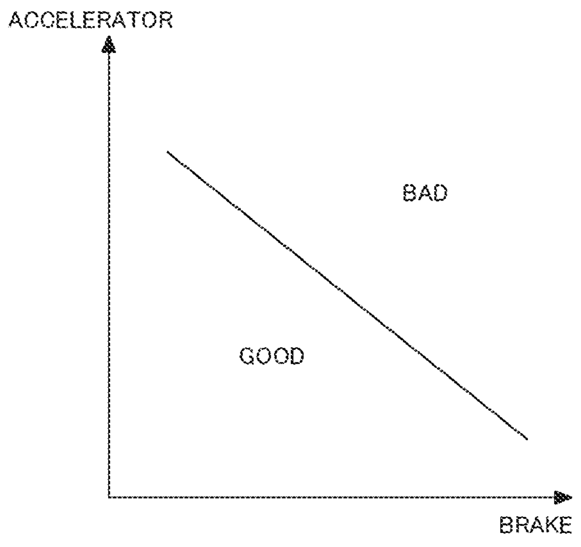
FIG. 5 is a diagram for explaining another example of obtaining assessment information.

In addition, in the above-described embodiment, assessment information is acquired based on the assessment model 232, which is a machine learning model. However, this is not the only way to obtain assessment information. For example, assessment information may be obtained by a statistical method. 5 is a diagram for explaining another example of obtaining assessment information. The assessment information referred to in this section is information representing whether the condition of the vehicle 10 corresponds to "good" or "bad". The "break" on the horizontal axis in FIG. 5 corresponds to the information input to the brake field shown in FIG. 2. The "accelerator" on the vertical axis in FIG. 5 corresponds to information input to the accelerator field shown in FIG. 2. Then, the boundary between "good" and "bad" is obtained using statistical methods. Then, when acquiring the assessment information, the points corresponding to the brake and accelerator of FIG. 5 are plotted based on the vehicle information, and the control unit 220 determines whether the position of the points belongs to "good" or "bad". The control unit 220 outputs information on the determination result as assessment information. In FIG. 5, the condition of the vehicle 10 is expressed in two stages, "good" and "bad", but this is not limited thereto, and it can also be expressed in four stages, for example, "excellent", "good", "acceptable", and "not acceptable". Even in the above manner, the control unit 220 can obtain the assessment information.

In addition, the processing and configuration described in the present disclosure can be freely combined and implemented as long as no technical contradiction occurs. In addition, the processing described as being performed by a single device may be shared and performed by a plurality of devices. In addition, the processing described as being performed by a single device or unit may be performed by one device or unit. In a computer system, a hardware configuration for realizing each function thereof can be changed in a flexible manner.

What is claimed is:

1. An information processing apparatus including a controller configured to perform:

acquiring, from sensors installed in a vehicle and connected to an electronic control unit (ECU), and accumulating a plurality of types of data collected in the vehicle, the plurality of types of data being detected by the sensors and correlated with deterioration of the vehicle, wherein accumulating the plurality of types of data comprises, for each type of data, calculating an incremental change in a sensor measurement and adding the incremental change to a cumulative total stored in a memory, the accumulated plurality of types of data representing cumulative totals of sensor measurements from an initial state of the vehicle to a current state of the vehicle, wherein the plurality of types of data includes at least two of data on an operating angle of a steering wheel, data on a travel distance of a accelerator pedal, data on a travel distance of a brake pedal, and data on an operating time of an engine;

generating a relationship between an accumulated plurality of types of data and a result of an actual assessment of the vehicle corresponding to the accumulated plurality of types of data by training a model in which the accumulated plurality of types of data for each of a plurality of vehicles are used as input data, information on an assessment of each of the plurality of vehicles is used as output data, and the accumulated plurality of types of data and data indicating the result of the actual assessment of each of the plurality of vehicles are used as corresponding training data, and outputting information on an assessment of a first vehicle according to the plurality of types of data accumulated for the first vehicle and the relationship, the information including a numerical value or a rank indicating a condition of the first vehicle.

2. The information processing apparatus according to claim 1, wherein the controller is further configured to transmit a command to cause a terminal of a user of the first vehicle to display the information on the assessment of the first vehicle when outputting the information on the assessment of the first vehicle.

3. The information processing apparatus according to claim 1, wherein the controller is further configured to:

generate and store, in the memory, the model;

acquire information on the assessment of the first vehicle by inputting the plurality of types of data corresponding to the first vehicle to the model in response to a request for information on the assessment of the first vehicle from a terminal of a user; and transmit the acquired information on the assessment of the vehicle to the terminal of the user.

4. The information processing apparatus according to claim 1, wherein the plurality of types of data represents physical quantities corresponding to forces applied to components of the vehicle that contribute to mechanical deterioration of the vehicle.

* * * * *